US010005878B2

(12) United States Patent
Martinez et al.

(10) Patent No.: US 10,005,878 B2
(45) Date of Patent: Jun. 26, 2018

(54) PROCESS TO PRODUCE A POLYOLEFIN REACTIVE TELECHELIC PRE-POLYMER, POLYOLEFIN REACTIVE TELECHELIC PRE-POLYMERS AND CROSSLINKED ELASTOMERS AND HIGH MOLECULAR WEIGHT ELASTOMERS

(71) Applicants: Dow Global Technologies LLC, Midland, MI (US); Regents of the University of Minnesota, Minneapolis, MN (US)

(72) Inventors: Henry Martinez, Minneapolis, MN (US); Marc A. Hillmyer, Minneapolis, MN (US); Jeffrey C. Munro, Bellaire, TX (US); Kim L. Walton, Lake Jackson, TX (US); Morgan M. Hughes, Angleton, TX (US)

(73) Assignees: Dow Global Technologies LLC, Midland, MI (US); Regents of the University of Minnesota

( * ) Notice: Subject to any disclaimer, the term of this patent is extended or adjusted under 35 U.S.C. 154(b) by 0 days. days.

(21) Appl. No.: 15/024,948

(22) PCT Filed: Sep. 18, 2014

(86) PCT No.: PCT/US2014/056195
§ 371 (c)(1),
(2) Date: Mar. 25, 2016

(87) PCT Pub. No.: WO2015/047840
PCT Pub. Date: Apr. 2, 2015

(65) Prior Publication Data
US 2016/0237203 A1 Aug. 18, 2016

Related U.S. Application Data

(60) Provisional application No. 61/884,594, filed on Sep. 30, 2013.

(51) Int. Cl.
*C08G 61/08* (2006.01)
*C08G 61/06* (2006.01)
*C08G 73/02* (2006.01)

(52) U.S. Cl.
CPC ............. *C08G 61/06* (2013.01); *C08G 61/08* (2013.01); *C08G 73/02* (2013.01); *C08G 2261/12* (2013.01); *C08G 2261/135* (2013.01); *C08G 2261/1412* (2013.01); *C08G 2261/3322* (2013.01); *C08G 2261/418* (2013.01); *C08G 2261/724* (2013.01); *C08G 2261/76* (2013.01)

(58) Field of Classification Search
CPC .................................................... C08G 61/08
See application file for complete search history.

(56) References Cited

U.S. PATENT DOCUMENTS 3,333,024 A 7/1967 Haefele et al.
3,415,789 A 12/1968 Coover et al.
3,595,942 A 7/1971 Wald et al.
3,700,633 A 10/1972 Wald et al.
3,810,957 A 5/1974 Lunk et al.
4,443,622 A 4/1984 Smith
5,512,635 A 5/1996 Nubel et al.
5,612,422 A 3/1997 Hucul et al.
5,654,253 A 8/1997 Hucul et al.
6,153,714 A * 11/2000 Bansleben ............. C08G 61/08
526/171
6,376,622 B1 4/2002 Hucul
6,395,841 B1 5/2002 Calverley et al.
6,486,264 B1 * 11/2002 Tsunogae ............... C08G 61/08
525/332.1
2010/0029874 A1 * 2/2010 Iwasaki .................. C08G 61/08
526/171
2016/0159942 A1 * 6/2016 Michaud .................. C08F 2/42
525/288
2016/0333140 A1 * 11/2016 Martinez ................ C08G 61/08

FOREIGN PATENT DOCUMENTS

DE 4133978 4/1993
FR 3008982 * 1/2015
GB 2011911 A 7/1979
WO WO 02/079127 10/2002

OTHER PUBLICATIONS

PCT Search Report dated Nov. 12, 2014; from counterpart PCT Application No. PCT/US2014/056195.
PCT IPRP dated Apr. 5, 2016; from counterpart PCT Application No. PCT/US2014/056195.
Shingo Kobayashi et al; Regio- and Stereoselective Ring-Opening Metathesis Polymerization of 3-Substituted Cyclooctenes, Journal of the American Chemical Society 2011 ACS Publications, vol. 133, No. 15, pp. 5794-5797.
Henry Martinez et al.; "Carboxy-Telechelic Polyolefins in Cross-Linked Elastomers", Macromolecules, vol. 47, No. 2, Jan. 28, 2014; pp. 479-485.
Singo Kobayashi et al.; "Functionalized Linear Low-Density Polyethylene by Ring-Opening Metathesis Polymerization", Polymer Chemistry, vol. 4, No. 4, Jan. 1, 2013; p. 1193-1198.
John Carl Falk; "Polymer Hydrogenations with Soluble Lithium/Cobalt and Aluminum/Cobalt Catalysts", Catalytic in Organic Synthesis, pp. 305-324.
L.A. Mango, et al. "Hydrogenation of Unsaturated Polymers with Dimide", Die Makromolekulare Chemie 163 (1973), pp. 13-36.
H. James Harwood, et al. "Dimide as a Reagent for the Hydrogenation of Unsaturated Polymers", Die Makromolekulare Chemie 163 (1973), pp. 1-12.
Louis M. Pitet et al "Carboxy-Telechelic Polyolefins by ROMP Using Maleic Acid as a Chain Transfer Agent", Macromolecules 2011, 44, 2378-2381.

* cited by examiner

Primary Examiner — David J Buttner

(57) ABSTRACT

A process to produce a polyolefin reactive telechelic pre-polymer comprising reacting alkyl-cis-cyclooctene and optionally cis-cyclooctene, in the presence of a difunctional chain transfer agent under ring opening metathesis polymerization conditions to form an unsaturated polyolefin reactive telechelic pre-polymer is provided. Further provided are unsaturated and hydrogenated reactive pre-polymers, cross-linked elastomers and high molecular weight elastomers.

17 Claims, No Drawings

PROCESS TO PRODUCE A POLYOLEFIN REACTIVE TELECHELIC PRE-POLYMER, POLYOLEFIN REACTIVE TELECHELIC PRE-POLYMERS AND CROSSLINKED ELASTOMERS AND HIGH MOLECULAR WEIGHT ELASTOMERS

FIELD OF INVENTION

The instant invention relates to a process to produce a polyolefin reactive telechelic pre-polymer, polyolefin reactive telechelic pre-polymers, crosslinked elastomers and high molecular weight elastomers.

BACKGROUND OF THE INVENTION

Polyolefins are useful materials as high molar mass polymers. The high chemical and oxidation resistance coupled with the competitive price of saturated polyolefin materials make polyolefins highly desirable to the plastics industry. It has been demonstrated that controlled inclusion of functional groups on the polyolefins can lead to property enhancements. However, despite the vast number of materials and applications derived from polyolefins, their pre-polymers for the formation of rapidly cured elastomers is an under-explored area. This is primarily because the precise and controlled functionalization has been challenging. Most methods for incorporation of reactive groups in polyolefins involve post-polymerization reactions, which generally have poor control over the functionalization location and quantity and leads to diminished mechanical properties. The synthesis of moldable, injectable, and otherwise processable polyolefin reactive telechelic pre-polymers, that form cured elastomers, would provide desirable alternatives to silicone and urethane elastomers.

SUMMARY OF THE INVENTION

The instant invention is a process to produce a polyolefin reactive telechelic pre-polymer, polyolefin reactive telechelic pre-polymers, crosslinked elastomers and high molecular weight elastomers.

In one embodiment, the instant invention provides a process to produce a polyolefin reactive telechelic pre-polymer comprising reacting alkyl-cis-cyclooctene and optionally cis-cyclooctene, in the presence of a difunctional chain transfer agent and/or a polyfunctional chain transfer agent under ring opening metathesis polymerization conditions to form an unsaturated polyolefin reactive telechelic pre-polymer.

DETAILED DESCRIPTION OF THE INVENTION

The instant invention is a process to produce a polyolefin reactive telechelic pre-polymer, polyolefin reactive telechelic pre-polymers, crosslinked elastomers and high molecular weight elastomers.

The process to produce a polyolefin reactive telechelic pre-polymer according to the present invention comprises reacting alkyl-cis-cyclooctene and optionally cis-cyclooctene, in the presence of a difunctional chain transfer agent and/or a polyfunctional chain transfer agent under ring opening metathesis polymerization conditions to form an unsaturated polyolefin reactive telechelic pre-polymer.

In an alternative embodiment, the instant invention further provides an unsaturated polyolefin reactive telechelic pre-polymer reaction product produced by any embodiment of the inventive process disclosed herein.

In an alternative embodiment, the instant invention provides a process to produce a polyolefin reactive telechelic pre-polymer, in accordance with any embodiment disclosed herein, except that the process further comprises hydrogenating the unsaturated polyolefin reactive telechelic pre-polymer to produce a hydrogenated polyolefin reactive telechelic pre-polymer.

In another alternative embodiment, the instant invention further provides a hydrogenated polyolefin reactive telechelic pre-polymer reaction product.

In an alternative embodiment, the instant invention provides a process to produce a polyolefin reactive telechelic pre-polymer, in accordance with any embodiment disclosed herein, except that the process further comprises thermally crosslinking the hydrogenated polyolefin reactive telechelic pre-polymer with a polyfunctional compound which is reactive with the telechilic pre-polymer, optionally in the absence of a catalyst, to form a crosslinked elastomer.

In an alternative embodiment, the instant invention provides a process to produce a polyolefin reactive telechelic pre-polymer, in accordance with any embodiment disclosed herein, except that the process further comprises chain extending the hydrogenated polyolefin reactive telechelic pre-polymer with a first difunctional compound which is reactive with the telechelic pre-polymer, optionally in the absence of a catalyst, to form a high molecular weight elastomer. As used herein, high molecular weight elastomer means an elastomer having a molecular weight at least two times the molecular weight of the polyolefin reactive telechelic pre-polymer. All individual values and subranges from at least two times are included herein and disclosed herein. For example, the molecular weight of the high molecular weight elastomer can be from a lower limit of two times the molecular weight of the polyolefin reactive telechelic pre-polymer, or in the alternative, the molecular weight of the high molecular weight elastomer can be from a lower limit of five times the molecular weight of the polyolefin reactive telechelic pre-polymer, or in the alternative, the molecular weight of the high molecular weight elastomer can be from a lower limit of ten times the molecular weight of the polyolefin reactive telechelic pre-polymer, or in the alternative, the molecular weight of the high molecular weight elastomer can be from a lower limit of fifteen times the molecular weight of the polyolefin reactive telechelic pre-polymer.

In an alternative embodiment, the instant invention provides a process to produce a polyolefin reactive telechelic pre-polymer, in accordance with any embodiment disclosed herein, except that the process further comprises simultaneously chain extending the hydrogenated polyolefin reactive telechelic pre-polymer with a mixture of a difunctional compound and thermally crosslinking the chain extending hydrogenated polyolefin reactive telechelic pre-polymer with a polyfunctional compound, both which are reactive with the telechelic pre-polymer, optionally in the absence of a catalyst, to form a chain extended, crosslinked elastomer.

In another alternative embodiment, the instant invention further provides a crosslinked elastomer.

In another alternative embodiment, the instant invention further provides a chain extended elastomer.

Alkyl-cis-cyclooctenes useful in embodiments of the invention are known in the art. Exemplary alkyl-cis-cyclooctenes include 3-substituted-cis-cyclooctenes, such 3-methyl-cis-cyclooctene, 3-ethyl-cis-cyclooctene, 3-hexyl-cis-cyclooctene, and 3-phenyl-cis-cyclooctenes.

Any difunctional chain transfer agent known in the art can be used in embodiments of the invention. Difunctional chain transfer agents include, for example, maleic acid, cis-1,4-Diacetoxy-2-butene, 1,8-Dicyano-4-octene, and dimethyl trans-3-hexenedioate.

In yet another alternative embodiment, one or more multi-functional chain transfer agents may be used. Exemplary multi-functional chain transfer agents include 2-butene-1,1,4,4-tetrol; (Z)-but-2-ene-1,4-diyl bis(3-hydroxy-2-(hydroxymethyl)-2-methylpropanoate); and (Z)-2,2'-(but-2-ene-1,4-diylbis(oxy))bis(oxomethylene)bis(2-methylpropane-3,2,1-triyl) tetrakis(3-hydroxy-2-(hydroxymethyl)-2-methylpropanoate). Multi-functional chain transfer agents would give rise to multi-functional pre-polymers which may subsequently be converted into crosslinked elastomers.

Ring opening metathesis polymerization (ROMP) conditions are known in the art and are described for example in "Regio- and Stereoselective Ring-Opening Metathesis Polymerization of 3-Substituted Cyclooctenes," Shingo Kobayashi et al, J. Am. Chem. Soc. 2011, 133, 5794-5797 and "Carboxy-Telechelic Polyolefins by ROMP Using Maleic Acid as a Chain Transfer Agent," Pitet and Hillmyer, Macromolecules 2011, 44, 2378-2381. A wide variety of catalysts are known to be useful in ROMP, including simple metal based compounds, such as a RuCl$_3$/alcohol mixture and more complex Grubbs' catalysts, which includes first and second generation Grubbs' catalysts and Hoveyda-Grubbs catalysts. First generation Grubbs' catalysts is a transition metal carbene complex having the general formula:

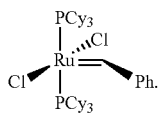

Second generation Grubbs' catalyst have the general formula:

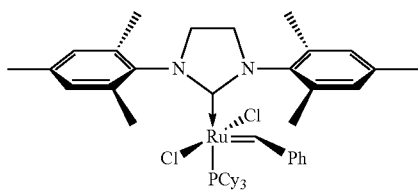

Hoyveda-Grubbs catalysts have the general formula:

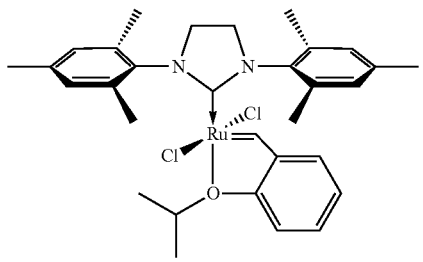

A skilled artisan would understand that any catalyst suitable for ROMP may be used. The invention is not limited by the foregoing catalyst structures nor by the use of Ruthenium as the metal for such catalysts.

In an alternative embodiment, the instant invention provides a process to produce a polyolefin reactive telechelic pre-polymer, an unsaturated polyolefin reactive telechelic pre-polymer, a hydrogenated polyolefin reactive telechelic pre-polymer, a crosslinked elastomer and a high molecular weight elastomer, in accordance with any embodiment disclosed herein, except that the mole ratio of cis-cyclooctene to alkyl-cis-cyclooctene is from 1:0.05 to 0.05:1. All individual values and subranges from 1:0.05 to 0.05:1 are included herein and disclosed herein. For example, the mole ratio of cis-cyclooctene to alkyl-cis-cyclooctene may be in the range from 1:0.05 to 0.05:1, or in the alternative, the mole ratio of cis-cyclooctene to alkyl-cis-cyclooctene may be in the range from 1:0.08 to 0.08:1, or in the alternative, the mole ratio of cis-cyclooctene to alkyl-cis-cyclooctene may be in the range from 1:0.5 to 0.5:1, or in the alternative, the mole ratio of cis-cyclooctene to alkyl-cis-cyclooctene may be in the range from 1:0.8 to 0.8:1.

In an alternative embodiment, the instant invention provides a process to produce a polyolefin reactive telechelic pre-polymer, an unsaturated polyolefin reactive telechelic pre-polymer, a hydrogenated polyolefin reactive telechelic pre-polymer, a crosslinked elastomer and a high molecular weight elastomer, in accordance with any embodiment disclosed herein, except that the unsaturated and/or hydrogenated polyolefin reactive telechelic pre-polymer has a molar mass from 1 to 20 kg/mole. All individual values and subranges from 1 to 20 kg/mole molar mass are included herein and disclosed herein; for example, the molar mass of the unsaturated polyolefin reactive telechelic pre-polymer can be from a lower limit of 1, 3, 6, 9, 12, 15, or 18 kg/mole to an upper limit of 2, 5, 8, 11, 14, 17 or 20 kg/mole.

In an alternative embodiment, the instant invention provides a process to produce a polyolefin reactive telechelic pre-polymer, an unsaturated polyolefin reactive telechelic pre-polymer, a hydrogenated polyolefin reactive telechelic pre-polymer, a crosslinked elastomer and a high molecular weight elastomer, in accordance with any embodiment disclosed herein, except that the unsaturated and/or hydrogenated polyolefin reactive telechelic pre-polymer exhibits one or more of the following properties: (a) a decomposition temperature, $T_d$, of equal to or greater than 310° C.; and (b) a glass transition temperature, Tg, equal to or less than −25° C.

For those embodiments in which the unsaturated and/or hydrogenated polyolefin reactive telechelic pre-polymer exhibits a $T_d$ of equal to or greater than 310° C., all individual values and subranges from equal to or greater than 310° C. are included herein and disclosed herein. For example, the $T_d$ can be from a lower limit of 310° C., or in the alternative, the $T_d$ can be from a lower limit of 320° C., or in the alternative, the $T_d$ can be from a lower limit of 330° C., or in the alternative, the $T_d$ can be from a lower limit of 340° C., or in the alternative, the $T_d$ can be from a lower limit of 350° C.

Where the unsaturated and/or hydrogenated polyolefin reactive telechelic pre-polymer exhibits a glass transition temperature, Tg, equal to or less than −25° C., all individual values and subranges are included herein and disclosed herein. For example, the Tg can be from an upper limit of −25° C., or in the alternative, the Tg can be from an upper limit of −30° C., or in the alternative, the Tg can be from an upper limit of −35° C., or in the alternative, the Tg can be from an upper limit of −40° C. In an alternative embodiment, the unsaturated and/or hydrogenated polyolefin reactive telechelic pre-polymer exhibits a glass transition temperature greater than or equal to −250° C. All individual values and subranges greater than or equal to −250° C. are included herein and disclosed herein. For example, the Tg can range from a lower limit of −250° C., or in the alternative, from a lower limit of −200° C., or in the alternative, from a lower limit of −150° C., or in the alternative, from a lower limit of −100° C.

In an alternative embodiment, the instant invention provides an unsaturated polyolefin reactive telechelic pre-polymer which exhibits a $\Delta H_m$ of less than 56 J g$^{-1}$ ($2^{nd}$ heat). For embodiments in which the unsaturated polyolefin reactive telechelic pre-polymer exhibits a $\Delta H_m$ of less than 56 J g$^{-1}$ ($2^{nd}$ heat), all individual values and subranges less than 56 J g$^{-1}$ are included herein and disclosed herein. For example, the $\Delta H_m$ can be less than 56 J g$^{-1}$, or in the alternative, the $\Delta H_m$ can be less than 51 J g$^{-1}$, or in the alternative, the $\Delta H_m$ can be less than 46 J g$^{-1}$, or in the alternative, the $\Delta H_m$ can be less than 41 J g$^{-1}$.

In an alternative embodiment, the instant invention provides a hydrogenated polyolefin reactive telechelic pre-polymer which exhibits a $\Delta H_m$ of less than 277 J g$^{-1}$ ($2^{nd}$ heat). For embodiments in which the hydrogenated polyolefin reactive telechelic pre-polymer exhibits a $\Delta H_m$ of less than 277 J g$^{-1}$ ($2^{nd}$ heat), all individual values and subranges less than 277 J g$^{-1}$ are included herein and disclosed herein. For example, the $\Delta H_m$ can be less than 277 J g$^{-1}$, or in the alternative, the $\Delta H_m$ can be less than 200 J g$^{-1}$, or in the alternative, the $\Delta H_m$ can be less than 150 J g$^{-1}$, or in the alternative, the $\Delta H_m$ can be less than 100 J g$^{-1}$. In an alternative embodiment, the hydrogenated polyolefin reactive telechelic pre-polymer which exhibits a $\Delta H_m$ of greater than or equal to 0 J g$^{-1}$, or in the alternative, the $\Delta H_m$ of greater than or equal to 10 J g$^{-1}$, or in the alternative, the $\Delta H_m$ of greater than or equal to 20 J g$^{-1}$, or in the alternative, the $\Delta H_m$ of greater than or equal to 30 J g$^{-1}$, or in the alternative, the $\Delta H_m$ of greater than or equal to 50 J g$^{-1}$.

In an alternative embodiment, the instant invention provides a process to produce a polyolefin reactive telechelic pre-polymer, an unsaturated polyolefin reactive telechelic pre-polymer, a hydrogenated polyolefin reactive telechelic pre-polymer, a crosslinked elastomer and a high molecular weight elastomer, in accordance with any embodiment disclosed herein, except that the hydrogenating is catalytic hydrogenation and occurs in the presence of a hydrogenation catalyst. Hydrogenation catalysts are well known in the art.

In a particular embodiment, the hydrogenation catalyst is a catalyst which provides a saturation of at least 90% and which results in a hydrogenated polyolefin reactive telechelic pre-polymer having at least 1.7 functionalities per pre-polymer chain. All individual values and subranges from a lower limit of 1.7 functionalities per pre-polymer chain are included herein and disclosed herein. For example, the functionalities can be from a lower limit of 1.7, 1.8, 1.9, or 2.0 functionalities per pre-polymer chain. In an alternative embodiment, the a hydrogenated polyolefin reactive telechelic pre-polymer equal to or less than 10 functionalities per pre-polymer chain, or in the alternative, from equal to or less than 7 functionalities per pre-polymer chain, or in the alternative, from equal to or less than 4 functionalities per pre-polymer chain.

In an alternative embodiment, the instant invention provides a process to produce a polyolefin reactive telechelic pre-polymer, an unsaturated polyolefin reactive telechelic pre-polymer, a hydrogenated polyolefin reactive telechelic pre-polymer, a crosslinked elastomer, a high molecular weight elastomer and a crosslinked, chain extended elastomer, in accordance with any embodiment disclosed herein, except that at least 60% of the functionalities remain following hydrogenation. All individual values and subranges from at least 60% are included herein and disclosed herein.

For example, the percentage of functionalities remaining after hydrogenation can range from a lower limit of 60, 70, 80, 90 or 95.

In an alternative embodiment, the instant invention provides a process to produce a polyolefin reactive telechelic pre-polymer, an unsaturated polyolefin reactive telechelic pre-polymer, a hydrogenated polyolefin reactive telechelic pre-polymer, a crosslinked elastomer, a high molecular weight elastomer and a crosslinked, chain extended elastomer, in accordance with any embodiment disclosed herein, except that the hydrogenating results in at least 90% of the unsaturations present in the pre-polymer being hydrogenated. All individual values and subranges from at least 90% are included herein and disclosed herein; for example, the hydrogenation level can be from a lower limit of 90, 92.5, 95, or 97%.

Both homogeneous and heterogeneous catalyst systems have been widely used for the hydrogenation of ethylenically unsaturated polymers. Homogeneous catalytic processes are disclosed in U.S. Pat. Nos. 3,595,295; 3,595,942; 3,700,633 and 3,810,957, the disclosures of which are incorporated herein by reference, as well as in "Polymer Hydrogenations With Soluble Lithium/Cobalt And Aluminum/Cobalt Catalysts"; J. C. Falck, Catalysis In Organic Synthesis, E. D. P N Rylander and H. Greenfield, Academic Press, New York, 1976, pp. 305-24. Heterogeneous catalysts are disclosed in U.S. Pat. Nos. 3,333,024; and 3,415,789, the disclosures of which are incorporated herein by reference; Belgium Patent BE871348 and British Patent GB 2,011,911.

In an alternative embodiment, the instant invention provides a process to produce a polyolefin reactive telechelic pre-polymer, an unsaturated polyolefin reactive telechelic pre-polymer, a hydrogenated polyolefin reactive telechelic pre-polymer, a crosslinked elastomer, a high molecular weight elastomer and a crosslinked, chain extended elastomer, in accordance with any embodiment disclosed herein, except that the hydrogenating is catalytic hydrogenation at temperatures from 50 to 80° C. and pressures of 350 to 500 psi wherein the catalyst is a silica supported platinum catalyst. All individual values and subranges from 50 to 80° C. are included herein and disclosed herein; for example the temperature of the catalytic hydrogenation can be from a lower limit of 50, 55, 60, 65, 70, or 75° C. to an upper limit of 52, 57, 63, 68, 72, 77, or 80° C. For example, the temperature of the catalytic hydrogenation may range from 50 to 80° C., or in the alternative, the temperature of the catalytic hydrogenation may range from 65 to 80° C., or in the alternative, the temperature of the catalytic hydrogenation may range from 50 to 68° C., or in the alternative, the temperature of the catalytic hydrogenation may range from 60 to 75° C. All individual values and subranges from 350 to 500 psi are included herein and disclosed herein; for example the pressure of the catalytic hydrogenation can be from a lower limit of 350, 400, or 450 psi to an upper limit of 375, 425, 475 or 500 psi. For example, the pressure of the catalytic hydrogenation can range from 350 to 500 psi, or in the alternative, the pressure of the catalytic hydrogenation can range from 425 to 500 psi, or in the alternative, the pressure of the catalytic hydrogenation can range from 350 to 425 psi, or in the alternative, the pressure of the catalytic hydrogenation can range from 380 to 475 psi.

In an alternative embodiment, the instant invention provides a process to produce a polyolefin reactive telechelic pre-polymer, an unsaturated polyolefin reactive telechelic pre-polymer, a hydrogenated polyolefin reactive telechelic pre-polymer, a crosslinked elastomer, a high molecular weight elastomer and a crosslinked, chain extended elastomer, in accordance with any embodiment disclosed herein, except that the hydrogenating is chemical hydrogenation. Chemical hydrogenation is known in the art and described for example in Die Makromoleculare Chemie, 163, 1 (1973) and Die Makromolekulare Chemie, 163, 13 (1973). In chemical hydrogenation, hydrogen is extracted ("transferred") from "hydrogen-donors" in place of $H_2$ gas. Hydrogen donors, which often serve as solvents include hydrazine, dihydronaphthalene, dihydroanthracene, isopropanol, and formic acid.

In an alternative embodiment, the instant invention provides a process to produce a polyolefin reactive telechelic pre-polymer, an unsaturated polyolefin reactive telechelic pre-polymer, a hydrogenated polyolefin reactive telechelic pre-polymer, a crosslinked elastomer, a high molecular weight elastomer and a crosslinked, chain extended elastomer, in accordance with any embodiment disclosed herein, except that the process further comprises simultaneously thermally crosslinking the hydrogenated polyolefin reactive telechelic pre-polymer with a polyfunctional compound which is reactive with the polyolefin reactive telechelic pre-polymer and chain extending the hydrogenated polyolefin reactive telechelic pre-polymer with a difunctional compound which is reactive with the polyolefin reactive telechelic pre-polymer, optionally in the absence of a catalyst, to form a crosslinked and chain extended elastomer.

In an alternative embodiment, the instant invention provides a process to produce a polyolefin reactive telechelic pre-polymer, an unsaturated polyolefin reactive telechelic pre-polymer, a hydrogenated polyolefin reactive telechelic pre-polymer, a crosslinked elastomer, a high molecular weight elastomer and a crosslinked, chain extended elastomer, in accordance with any embodiment disclosed herein, except that the polyfunctional compound is selected from the group of polyamines and polyepoxides.

In an alternative embodiment, the instant invention provides a process to produce a polyolefin reactive telechelic pre-polymer, an unsaturated polyolefin reactive telechelic pre-polymer, a hydrogenated polyolefin reactive telechelic pre-polymer, a crosslinked elastomer, a high molecular weight elastomer and a crosslinked, chain extended elastomer, in accordance with any embodiment disclosed herein, except that the difunctional compound is selected from the group of diamines and diepoxides.

In an alternative embodiment, the instant invention provides a process to produce a polyolefin reactive telechelic pre-polymer, an unsaturated polyolefin reactive telechelic pre-polymer, a hydrogenated polyolefin reactive telechelic pre-polymer, a crosslinked elastomer, a high molecular weight elastomer and a crosslinked, chain extended elastomer, in accordance with any embodiment disclosed herein, except that the polyfunctional compound which is reactive with the polyolefin reactive telechelic pre-polymer is polyfunctional aziridine.

In an alternative embodiment, the instant invention provides a process to produce a polyolefin reactive telechelic pre-polymer, an unsaturated polyolefin reactive telechelic pre-polymer, a hydrogenated polyolefin reactive telechelic pre-polymer, and a high molecular weight elastomer, in accordance with any embodiment disclosed herein, except that the difunctional compound which is reactive with the polyolefin reactive telechelic pre-polymer is difunctional aziridine.

In an alternative embodiment, the instant invention provides a process to produce a polyolefin reactive telechelic pre-polymer, an unsaturated polyolefin reactive telechelic pre-polymer, a hydrogenated polyolefin reactive telechelic pre-polymer, a crosslinked elastomer and a high molecular weight elastomer, in accordance with any embodiment disclosed herein, except that the polyfunctional aziridine is trimethylolpropane tri(2-methyl-1-aziridine propionate).

In an alternative embodiment, the instant invention provides a process to produce a polyolefin reactive telechelic pre-polymer, an unsaturated polyolefin reactive telechelic pre-polymer, a hydrogenated polyolefin reactive telechelic pre-polymer, a crosslinked elastomer and a high molecular weight elastomer, in accordance with any embodiment disclosed herein, except that the difunctional aziridine is butane-1,4-diyl bis(3-(2-methylaziridin-1-yl)propanoate).

In an alternative embodiment, the instant invention provides a process to produce a polyolefin reactive telechelic pre-polymer, an unsaturated polyolefin reactive telechelic pre-polymer, a hydrogenated polyolefin reactive telechelic pre-polymer, a crosslinked elastomer and a high molecular weight elastomer, in accordance with any embodiment disclosed herein, except that the mole ratio of the functionalities on the polyfunctional compound to the functionalities of the polyolefin reactive telechelic pre-polymer is from 1:2 to 2:1. All individual values and subranges from 1:2 to 2:1 are included herein and disclosed herein; for example, the mole ratio of the functionalities on the polyfunctional compound to the functionalities of the polyolefin reactive telechelic pre-polymer can be 1:2, or in the alternative, the mole ratio of the functionalities on the polyfunctional compound to the functionalities of the polyolefin reactive telechelic pre-polymer can be 2:1, or in the alternative, the mole ratio of the functionalities on the polyfunctional compound to the functionalities of the polyolefin reactive telechelic pre-polymer can be 1.5:2, or in the alternative, the mole ratio of the functionalities on the polyfunctional compound to the functionalities of the polyolefin reactive telechelic pre-polymer can be 2:1.5, or in the alternative, the mole ratio of the functionalities on the polyfunctional compound to the functionalities of the polyolefin reactive telechelic pre-polymer can be 1:1.05, or in the alternative, the mole ratio of the functionalities on the polyfunctional compound to the functionalities of the polyolefin reactive telechelic pre-polymer can be 1:0.95. In a particular embodiment, the mole ratio of the functionalities on the polyfunctional compound to the functionalities of the polyolefin reactive telechelic pre-polymer is from 1:0.94 to 1:1.06.

In an alternative embodiment, the instant invention provides a process to produce a polyolefin reactive telechelic pre-polymer, an unsaturated polyolefin reactive telechelic pre-polymer, a hydrogenated polyolefin reactive telechelic pre-polymer, a crosslinked elastomer and a high molecular weight elastomer, in accordance with any embodiment disclosed herein, except that the mole ratio of the functionalities on the difunctional and polyfunctional compound to the functionalities of the polyolefin reactive telechelic pre-polymer is from 1:2 to 2:1. All individual values and subranges from 1:2 to 2:1 are included herein and disclosed herein; for example, the mole ratio of the functionalities on the difunctional and polyfunctional compound to the functionalities of the polyolefin reactive telechelic pre-polymer can be 1:2, or in the alternative, the mole ratio of the functionalities on the difunctional and polyfunctional compound to the functionalities of the polyolefin reactive telechelic pre-polymer can be 2:1, or in the alternative, the mole ratio of the functionalities on the difunctional and polyfunctional compound to the functionalities of the polyolefin reactive telechelic pre-polymer can be 1.5:2, or in the alternative, the mole ratio of the functionalities on the difunctional and polyfunctional compound to the functionalities of the polyolefin reactive telechelic pre-polymer can be 2:1.5, or in the alternative, the mole ratio of the functionalities on the difunctional and polyfunctional compound to the functionalities of the polyolefin reactive telechelic pre-polymer can be 1:1.05, or in the alternative, the mole ratio of the functionalities on the difunctional and polyfunctional compound to the functionalities of the polyolefin reactive telechelic pre-polymer can be 1:0.95. In a particular embodiment, the mole ratio of the functionalities on the difunctional and polyfunctional compound to the functionalities of the polyolefin reactive telechelic pre-polymer is from 1:0.94 to 1:1.06.

In an alternative embodiment, the instant invention provides a process to produce a polyolefin reactive telechelic pre-polymer, an unsaturated polyolefin reactive telechelic pre-polymer, a hydrogenated polyolefin reactive telechelic pre-polymer, a crosslinked elastomer and a high molecular weight elastomer, in accordance with any embodiment disclosed herein, except that the crosslinked and/or high molecular weight elastomer exhibits one or more properties selected from the group consisting of: (a) gel fraction of equal to or less than 0.99 and equal to or greater than 0.3; (b) a $T_d$ of equal to or greater than 310° C.; (c) a glass transition temperature, Tg, less than or equal to or less than −25° C.; (d) hysteresis of 20% or less; and (e) a difference in an elastic modulus at 0° C. and the elastic modulus at a temperature 1° C. less than the decomposition temperature is less than 35%.

In a particular embodiment, the crosslinked and/or chain-extended, crosslinked elastomer exhibits a gel fraction of equal to or less than 0.99 and equal to or greater than 0.3. All individual values and subranges from equal to or less than 0.99 and equal to or greater than 0.3 are included herein and disclosed herein; for example, the gel fraction of the crosslinked and/or chain-extended, crosslinked elastomer can be from a lower limit of 0.3, 0.4, 0.5, 0.6, 0.7, 0.8 or 0.9 to an upper limit of 0.35, 0.46, 0.57, 0.68, 0.73, 0.82 or 0.99. For example, the gel fraction of the crosslinked and/or chain-extended, crosslinked elastomer can be in the range from 0.3 to 0.99, or in the alternative, the gel fraction of the crosslinked and/or chain-extended, crosslinked elastomer can be in the range from 0.3 to 0.66, or in the alternative, the gel fraction of the crosslinked and/or chain-extended, crosslinked elastomer can be in the range from 0.66 to 0.99, or in the alternative, the gel fraction of the crosslinked and/or chain-extended, crosslinked elastomer can be in the range from 0.45 to 0.75, or in the alternative, the gel fraction of the crosslinked and/or chain-extended, crosslinked elastomer can be in the range from 0.6 to 0.8, or in the alternative, the gel fraction of the crosslinked and/or chain-extended, crosslinked elastomer can be in the range from 0.65 to 0.99.

For those embodiments in which the crosslinked and/or high molecular weight and/or chain-extended, crosslinked elastomer exhibits a $T_d$ of equal to or greater than 310° C., all individual values and subranges from equal to or greater than 310° C. are included herein and disclosed herein. For example, the $T_d$ can be from a lower limit of 310° C., or in the alternative, the $T_d$ can be from a lower limit of 320° C., or in the alternative, the $T_d$ can be from a lower limit of 330° C., or in the alternative, the $T_d$ can be from a lower limit of 340° C., or in the alternative, the $T_d$ can be from a lower limit of 350° C.

Where the crosslinked and/or high molecular weight and/or chain-extended, crosslinked elastomer exhibits a glass transition temperature, Tg, less than or equal to or less than −25° C., all individual values and subranges are included herein and disclosed herein. For example, the Tg can be from an upper limit of −25° C., or in the alternative, the Tg can be from an upper limit of −30° C., or in the alternative, the Tg can be from an upper limit of −35° C., or in the alternative, the Tg can be from an upper limit of −40° C.

All individual values and subranges from a hysteresis of 20% or less are included herein and disclosed herein; for example, the hysteresis of the crosslinked and/or chain-extended, crosslinked elastomer can be from an upper limit of 20, 18, 16, 14 or 12%.

In those embodiments where a difference in an elastic modulus at 0° C. and the elastic modulus at a temperature 1° C. less than the decomposition temperature is less than 35% is exhibited, all individual values and subranges from less than 35% are included herein and disclosed herein. For example, the difference in an elastic modulus at 0° C. and the elastic modulus at a temperature 1° C. less than the decomposition temperature can be from an upper limit of 35, 30, 25, 20, 15, or 10%.

EXAMPLES

The following examples illustrate the present invention but are not intended to limit the scope of the invention.

Materials

Cis-Cyclooctene was purchased from Fisher Scientific and purified by redistillation. Grubbs second generation (G2) catalyst, ethyl vinyl ether, and maleic acid were purchased from Sigma-Aldrich and used as received. Pt/Silica supported catalyst and Trimethylolpropane tri(2-methyl-1-aziridine propionate) were obtained from The Dow Chemical Company and PolyAziridine LLC, respectively and used as received. The Pt/Silica supported catalyst is described in U.S. Pat. Nos. 5,028,665; 5,612,422; 5,654,253; 6,090,359; 6,399,538; 6,376,622; and 6,395,841, the disclosures of which are incorporated herein by reference. 3-Hexyl-cis-cyclooctene was synthesized using the procedure disclosed in Kobayashi, S.; Pitet, L. M.; Hillmyer, M. A. *J. Am. Chem. Soc.* 2011, 133, 5794. Tetrahydrofuran for polymerization and cyclohexane for catalytic hydrogenation were purified with an M. Braun (Stratham, N.H.) solvent purification system.

Polymerization of Cis-Cyclooctene with Maleic Acid as Chain Transfer Agent to Produce Comparative Unsaturated Pre-Polymer 1 (P-0)

Following the general copolymerization procedure, Maleic Acid (71.9 mg, 0.62 mmol), cis-cyclooctene (2.5 g, 22.7 mmol), G2 (4.8 mg, 5.6 μmol) and anhydrous THF (10 mL) were mixed. Upon isolation, a solid, white-off polymer having the structure shown below was obtained (96%).

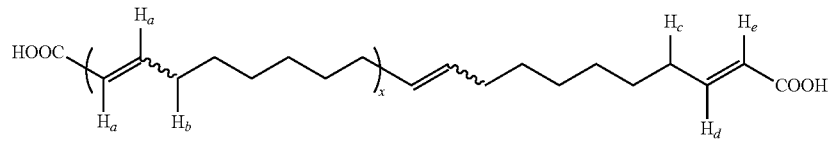

$^1$H NMR (500 MHz, CDCl$_3$, ppm): δ 7.08 (H$_d$, dt, J=15.57, 7.04 Hz), 5.82 (H$_e$, d, J=15.58), 5.46-5.26 (H$_a$, broad), 2.23 (H$_c$, m), 1.82-2.13 (H$_b$, bm), 1.10-1.55 (CH$_2$'s, broad).

$^{13}$C NMR (125 MHz, CDCl$_3$, ppm): repeat unit −δ 130.4 (Trans), 129.9 (Cis), 32.6, 29.77, 29.66, 29.20, 29.10, 29.06, 27.23.

Copolymerization of Cis-Cyclooctene and 3-Hexyl-Cis-Cyclooctene in 3:1 Molar Ratio with Maleic Acid as Chain Transfer Agent to Produce Inventive Unsaturated Pre-Polymer 1 (P-25)

Following the general copolymerization procedure, Maleic Acid (75.6 mg, 0.65 mmol), cis-cyclooctene (1.65 g, 15 mmol), 3-hexyl-cis-cyclooctene (0.97 g, 5 mmol), G2 (4.2 mg, 4.9 µmol) and anhydrous THF (10 mL) were mixed. Upon isolation, a viscous, light-yellow polymer was obtained (89%).

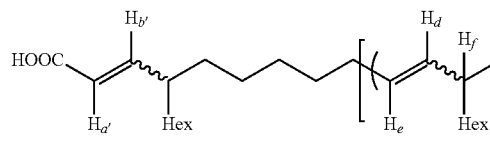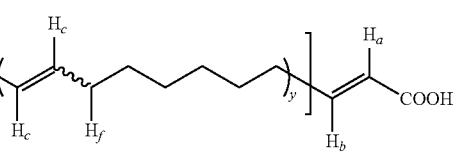

$^1$H NMR (500 MHz, CDCl$_3$, ppm): δ 7.08 (H$_b$, dt, J=15.58, 7.04 Hz), 6.85 (H$_{b'}$, dd, J=15.63, 9.7 Hz), 5.82 (H$_a$, d, J=15.17), 5.77 (H$_{a'}$, d, J=15.23 Hz), 5.44-5.25 (H$_c$, H$_e$, broad), 5.11-5.02 (H$_d$, m), 2.23 (CH$_2$—CH$_b$, m), 2.12-1.76 (H$_f$, bm), 1.53-1.04 (CH$_2$'s), 0.88 (CH$_3$, t, J=6.68 Hz).

$^{13}$C NMR (125 MHz, CDCl$_3$, ppm): repeat unit –δ 135.1 (C—H$_d$), δ 130.4 (trans) (C—H$_c$), 129.9 (cis) (C—H$_c$), 130.0 (C—H$_e$) δ 42.8 (CH-Hex) δ, 35.6, 35.6, 32.6, 32.0, 29.8-27.2, 22.7 (CH$_2$'s), δ 14.2 (CH$_3$). End group δ 152.4 (CO).

Copolymerization of Cis-Cyclooctene and 3-Hexyl-Cis-Cyclooctene in 1:1 Molar Ratio with Maleic Acid as Chain Transfer Agent to Produce Inventive Unsaturated Pre-Polymer 2 (P-50)

Following the general copolymerization procedure, Maleic Acid (87.8 mg, 0.76 mmol), cis-cyclooctene (1.10 g, 10 mmol), 3-hexyl-cis-cyclooctene (1.94 g, 10 mmol), G2 (4.2 mg, 4.9 µmol) and anhydrous THF (10 mL) were mixed. Upon isolation, a viscous, light-yellow polymer having the structure shown below was obtained (93%) and then characterized by $^1$H NMR, $^{13}$C NMR, SEC and DSC.

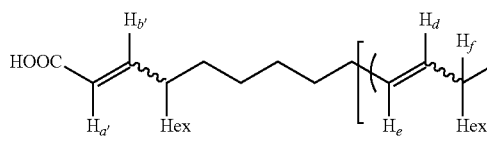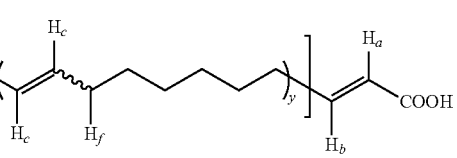

$^1$H NMR (500 MHz, CDCl$_3$, ppm): δ 7.08 (H$_b$, dt, J=15.57, 7.04 Hz), 6.82 (H$_{b'}$, dd, J=15.77, 9.7 Hz), 5.82 (H$_a$, d, J=15.58), 5.77 (H$_{a'}$, d, J=15.65 Hz), 5.38-5.26 (H$_c$, H$_e$, broad), 5.09-5.04 (H$_d$, m), 2.25 (CH$_2$—CH$_b$, m), 2.09-1.80 (H$_f$, bm), 1.55-1.10 (CH$_2$'s), 0.88 (CH$_3$, t, J=6.75 Hz).

$^{13}$C NMR (125 MHz, CDCl$_3$, ppm): repeat unit –δ 135.2 (C—H$_d$), δ 130.5 (trans) (C—H$_c$), 130.1 (cis) (C—H$_c$), 130.0 (C—H$_e$) δ 42.8 (CH-Hex), δ 35.6, 32.6, 32.0, 29.8-27.2, 22.7 (CH$_2$'s), δ 14.1 (CH$_3$). End group δ 152.4 (CO).

$M_n$(NMR,)=5.0 kg·mol$^{-1}$; $M_w$ (LS, THF)=10.4 kg·mol$^{-1}$; Đ (dRI, THF)=2.1.

Non-crystalline polymer, Tg=–66° C.

Copolymerization of Cis-Cyclooctene and 3-Hexyl-Cis-Cyclooctene in 1:3 Molar Ratio with Maleic Acid as Chain Transfer Agent to Make Inventive Unsaturated Pre-Polymer 3 (P-75)

Following the general copolymerization procedure, Maleic Acid (100 mg, 0.86 mmol), cis-cyclooctene (550 g, 5 mmol), 3-hexyl-cis-cyclooctene (2.91 g, 15 mmol), G2 (4.2 mg, 4.9 µmol) and anhydrous THF (10 mL) were mixed. Upon isolation, a viscous, light-yellow polymer having the structure shown below was obtained (87%) and was then characterized by $^1$H NMR, $^{13}$C NMR, SEC and DSC.

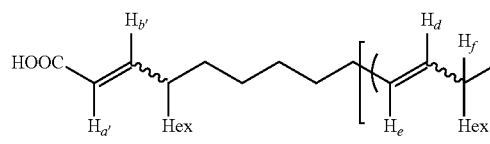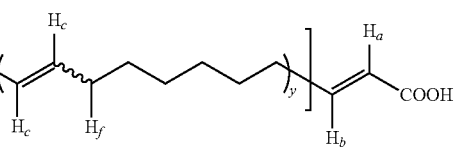

$^1$H NMR (500 MHz, CDCl$_3$, ppm): δ 7.08 (H$_b$, dt, J=15.57, 7.04 Hz), 6.85 (H$_{b'}$, dd, J=15.77, 9.7 Hz), 5.82 (H$_a$, d, J=15.55), 5.77 (H$_{a'}$, d, J=15.50 Hz), 5.38-5.25 (H$_c$, H$_e$, broad), 5.10-4.98 (H$_d$, m), 2.23 (CH$_2$—CH$_b$, m), 2.07-1.78 (H$_f$, bm), 1.51-1.07 (CH$_2$'s), 0.89 (CH$_3$, t, J=6.75 Hz).

$^{13}$C NMR (125 MHz, CDCl$_3$, ppm): repeat unit –δ 135.1 (C—H$_d$), δ 130.4 (trans) (C—H$_c$), 130.0 (C—H$_e$) δ 42.8 (CH-Hex), δ 35.6, 32.6, 32.0, 29.8-27.2, 22.7 (CH$_2$'s), δ 14.1 (CH$_3$).

$M_n$(NMR,)=4.2 kg·mol$^{-1}$; $M_w$ (LS, THF)=8.3 kg·mol$^{-1}$; Đ (dRI, THF)=1.9.

Non-crystalline polymer, Tg=–61° C.

Polymerization of 3-Hexyl-Cis-Cyclooctene with Maleic Acid as Chain Transfer Agent Inventive Unsaturated Pre-Polymer 4 (P-100)

Following the general copolymerization procedure, Maleic Acid (57.7 mg, 0.50 mmol), 3-hexyl-cis-cyclooctene (2.0 g, 10.3 mmol), G2 (2.18 mg, 2.6 µmol) and anhydrous THF (5 mL) were mixed. Upon isolation, a viscous, light-yellow polymer was obtained (89%).

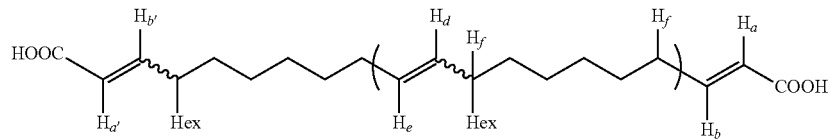

$^1$H NMR (500 MHz, CDCl$_3$, ppm): δ 7.05 (H$_b$, dt, J=15.49, 7.03 Hz), 6.85 (H$_{b'}$, dd, J=15.53, 9.7 Hz), 5.82 (H$_a$, d, J=15.55), 5.77 (H$_{a'}$, d, J=15.50 Hz), 5.39-5.22 (H$_e$, m), 5.11-4.95 (H$_d$, m), 2.21 (CH$_2$—CH$_b$, m), 2.04-1.77 (H$_f$, bm), 1.51-1.07 (CH$_2$'s), 0.89 (CH$_3$, t, J=6.76 Hz).

$^{13}$C NMR (125 MHz, CDCl$_3$, ppm): repeat unit –δ 135.1 (C—H$_d$), 130.0 (C—H$_e$) δ 42.8 (CH-Hex), δ 35.6, 32.6, 32.0, 29.8, 29.5, 29.3, 27.3, 27.2, 22.7 (CH$_2$'s), δ 14.1 (CH$_3$).

Table 1 provides the molecular weight, glass transition temperatures, melting temperatures, crystallization temperatures, ΔH$_m$, and decomposition temperatures for each of Inventive Unsaturated Pre-Polymers 1-4 and Comparative Unsaturated Pre-Polymer 1.

TABLE 1

| Unsaturated Pre-Polymer | M$_n$ (kg mol$^{-1}$) | T$_g$ (° C.) | T$_m$ (° C.) | T$_c$ (° C.) | ΔH$_m$ (J g$^{-1}$) | T$_d$ (° C.) |
|---|---|---|---|---|---|---|
| Comp. Ex. 1 | 5.0 | — | 62 | 51 | 56 | 406 |
| Inv. Ex. 1 | 4.6 | −68 | 22 | −10 | 17 | 409 |
| Inv. Ex. 2 | 5.0 | −66 | — | — | — | 348 |
| Inv. Ex. 3 | 4.2 | −61 | — | — | — | 378 |
| Inv. Ex. 4 | 5.1 | −56 | — | — | — | 385 |

Synthesis of Carboxy-Telechelic Low Density Polyethylene (LDPE) by Hydrogenation General Hydrogenation Conditions In a high pressure reactor (Pressure Products Industries, Inc.) was placed 1.2 g of X-300 catalyst. The reactor was sealed and the catalyst dried under vacuum at 80° C. for 3 h. The reactor was then filled with argon (80 psi) and allowed to cool to room temperature. A solution containing 12 g of polyolefin in 150 ml of cyclohexane was added to the reactor. While stirring, the reactor was charged with 350 psi of H$_2$. and then heated to 50-55° C. for 1.5 h. After this time, the reactor temperature was increased to 80° C.; after the system had equilibrated at this temperature, the reactor was charged additional hydrogen, to a pressure of 500 psi of H$_2$. After 15 h (total 16.5 h) the system was cooled to room temperature, purged once with argon and the reactor disassembled. The solution was filtrated using a millipore (0.45 micrometer HVHP membrane), concentrated to half of the original volume, and precipitated into 1 L of room temperature methanol. The solution was stirred for 1 hour and then the methanol was decanted to leave a solid or viscous liquid polymer. Viscous polymers were dissolved in a minimum amount of CH$_2$Cl$_2$ and then transferred to a glass vial. The solvent was removed and the polymer dried under high vacuum at 70° C. The dried polymers were characterized by $^1$H NMR, $^{13}$C NMR, SEC, TGA and DSC.

Hydrogenation of Comparative Unsaturated Pre-Polymer 1 to Produce Comparative Hydrogenated Pre-Polymer 1

Comparative Unsaturated Pre-Polymer 1 was hydrogenated as previously described. An off-white solid material having the structure shown below was obtained in 95% yield. >99% olefin hydrogenation and >1.99 acid functionalization.

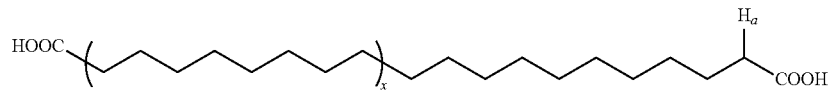

$^1$H NMR (500 MHz, ClCD$_2$CD$_2$Cl, ppm): δ 2.38 (H$_a$, t, J=7.10 Hz), δ 1.33 (CH$_2$'s, broad).

Hydrogenation of Inventive Unsaturated Pre-Polymer 1 to Produce Inventive Hydrogenated Pre-Polymer 1

Inventive Unsaturated Pre-Polymer 1 was hydrogenated as previously described. An off-white solid material having the structure shown below was obtained in 95% yield. >99% olefin hydrogenation and >1.99 acid functionalization.

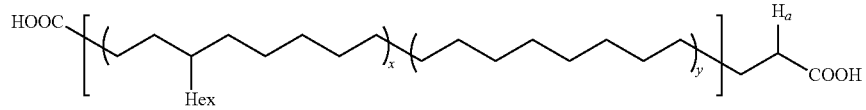

¹H NMR (500 MHz, CDCl₃, ppm): δ 2.36 (H$_a$, t, J=7.39 Hz), 1.37-δ 1.16 (CH₂'s, CH's, bm), δ 0.88 (CH₃, t, J=6.7 Hz).
¹³C NMR (125 MHz, CDCl₃, ppm): δ 37.2, 33.7, 32.0, 30.2, 29.9, 29.7, 26.7, 26.7, 22.7, 14.1.

Hydrogenation of Inventive Unsaturated Pre-Polymer 2 to Produce Inventive Hydrogenated Pre-Polymer 2

Inventive Unsaturated Pre-Polymer 2 was hydrogenated as previously described. A colorless, low melting, waxy material was obtained in 93% yield. >99% olefin hydrogenation and >1.99 acid functionalization.

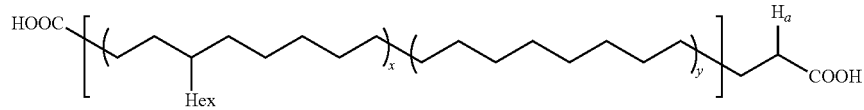

¹H NMR (500 MHz, CDCl₃, ppm): δ 2.35 (H$_a$, t, J=7.40 Hz), 1.40-δ 1.10 (CH₂'s, CH's, bm), δ 0.88 (CH₃, t, J=7.05 Hz).
¹³C NMR (125 MHz, CDCl₃, ppm): δ 37.6, 33.7, 32.0, 30.2, 29.9, 29.8, 26.7, 26.7, 22.7, 14.3.

Hydrogenation of Inventive Unsaturated Pre-Polymer 3 to Produce Inventive Hydrogenated Pre-Polymer 3

Inventive Unsaturated Pre-Polymer 3 was hydrogenated as previously describe. A colorless, viscous material was obtained in 90% yield. 98% olefin hydrogenation and >1.95 acid functionalization.

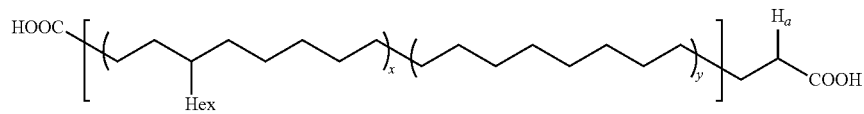

¹H NMR (500 MHz, CDCl₃, ppm): δ 2.35 (H$_a$, t, J=7.40 Hz), 1.40-δ 1.15 (CH₂'s, CH's, bm), δ 0.89 (CH₃, t, J=7.05 Hz).
¹³C NMR (125 MHz, CDCl₃, ppm): δ 37.6, 33.7, 32.0, 30.2, 29.9, 29.8, 26.7, 26.7, 22.7, 14.2.

Hydrogenation of Inventive Unsaturated Pre-Polymer 4 to Produce Inventive Hydrogenated Pre-Polymer 4

Comparative Unsaturated Pre-Polymer 2 was hydrogenated as previously describe. A colorless, viscous material was obtained in 92% yield. 95% olefin hydrogenation and >1.92 acid functionalization.

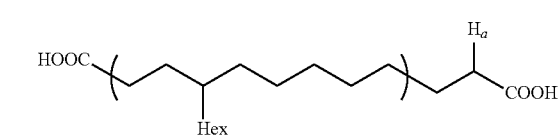

¹H NMR (500 MHz, CDCl₃, ppm): δ 2.33 (H$_a$, t, J=7.41 Hz), 1.40-δ 1.09 (CH₂'s, CH's, bm), δ 0.89 (CH₃, t, J=6.95 Hz).
¹³C NMR (125 MHz, CDCl₃, ppm): δ 37.5, 33.7, 32.0, 30.2, 29.9, 29.8, 26.7, 26.7, 22.8, 14.2.

Table 2 provides the molecular weight, glass transition temperatures, melting temperatures, crystallization temperatures, $\Delta H_m$, percent crystallinity and decomposition temperatures for each of Inventive Hydrogenated Pre-Polymers 1-4 and Comparative Hydrogenated Pre-Polymer 1.

TABLE 2

| Hydrogenated Pre-Polymer | $M_n$ (kg mol⁻¹) | $T_g$ (° C.) | $T_m$ (° C.) | $T_c$ (° C.) | $\Delta H_m$ (J g⁻¹) | Crystallinity (%) | $T_d$ (° C.) |
|---|---|---|---|---|---|---|---|
| Comp. Ex. 1 | 4.8 | — | 132 | 118 | 231 | 83 | 412 |
| Inv. Ex. 1 | 4.5 | — | 88 | 78 | 51 | 18 | 392 |
| Inv. Ex. 2 | 5.1 | −58 | 38$^i$ | 14 | 7 | 3 | 330 |
| Inv. Ex. 3 | 4.3 | −66 | — | — | — | — | 344 |
| Inv. Ex. 4 | 4.3 | −68 | — | — | — | — | 385 |

Thermal Crosslinking, General Procedure
Method A.

Tris-aziridine (TAz) and the hydrogenated carboxy telechelic polyolefin in 2.11:3 molar ratio (Acid/Aziridine=1/1.06) were mixed in a speed mixer (DAC 150.1 FVZ, FlackTek Inc.) at 1800 rpm in 20 segments of 45 seconds each. The mixture was then slowly transferred into a Teflon mold. The mold was place in an oven preheated at 180° C. and the material cured for 5 min. A colorless, transparent thermoset elastomer was obtained. The material was characterized by DSC, DMA, TGA and mechanical tests.

Method B (to Produce Chain-Extended, Crosslinked Elastomer).

Tris-aziridine (TAz), bis-aziridine (BAz) and the hydrogenated carboxy telechelic polyolefin were mixed in a speed mixer (DAC 150.1 FVZ, FlackTek Inc.) at 1800 rpm in 20 segments of 45 seconds each. The Acid/Aziridine mol ratio=1/1.06, while the TAz/BAz mol ratio=1/1. That implies that 60 μmol % of the aziridines are provided by the crosslinker (TAz) and 40 μmol % by the chain extender (BAz). The mixture was then slowly transferred into a Teflon mold. The mold was place in an oven preheated at 180° C. and the material cured for 5 min. A colorless, transparent thermoset elastomer was obtained. The material was characterized by DSC, DMA, TGA and mechanical tests.

Synthesis of butane-1,4-diyl bis(3-(2-methylaziridin-1-yl)propanoate) (BAz)

1,4-butanediol diacrylate (1.11 ml, 5.3 mmol) and 2-methylaziridine (1.25 ml, 15.9 mmol) were mixed and stirred at room temperature for 19 h (the flask was covered with aluminum foil to avoid light). After this time the excess of 2-methylaziridine was removed under high vacuum to yield the product in 97% yield.

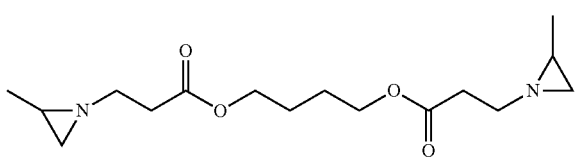 [SMILES: CC1CN1CCC(=O)OCCCCOC(=O)CCN1CC1C]

$^1$H NMR (500 MHz, CDCl$_3$, ppm): δ 4.07 (2H, CH$_2$—O, m), δ 2.51 (4H, N—CH$_2$CH$_2$—CO), δ 1.35 (1H, CH, m), δ 1.67 (2H, CH$_2$—CH2O), δ 1.43, (1H, CH$_2$(ring)-N, d, J=3.55 Hz), δ 1.21 (1H, CH$_2$(ring)-N, d, J=6.40 Hz), δ 1.10 (CH$_3$, d, J=5.5).

$^{13}$C NMR (125 MHz, CDCl$_3$, ppm): δ 172.3 (CO), δ 64.09 (CH$_2$—O), δ 56.3 (CH$_2$—N), δ 35.06 (CH$_2$—CO), δ 34.8 (CH), δ 34.8 (CH$_2$(ring)-N), δ 25.3 (CH$_2$—CH$_2$O), δ 18.4 (CH$_3$). Calculated HRMS: 312.2049 g/mol. Obtained HRMS: 312.2093 g/mol.

Chain Extension, General Procedure

Method A:

Bis-aziridine (BAz) and the hydrogenated acid telechelic polyolefin in 1:1 molar ratio were mixed in a speed mixer (DAC 150.1 FVZ, FlackTek Inc.) at 1800 rpm in 20 segments of 45 seconds each. The mixture was then stirred in a rheometer measuring the increment of viscosity as a function of time at 120° C. until the material turned into a clear, colorless soft solid. The polymer was characterized by SEC and DSC.

Method B:

A mixture of CHCl$_3$, Bis-aziridine (BAz) and the hydrogenated acid telechelic polyolefin in 1:1 molar ratio was stirred at 60° C. for 48 h. The solvent was removed to obtain a clear, colorless soft solid. The polymer was characterized by SEC and DSC.

Chain Extension of Inventive Hydrogenated Pre-Polymer 2 to Produce Inventive High Molecular Weight Elastomer 2

1.5 grams of Inventive Hydrogenated Pre-Polymer 2 and 97 mg of BAz were mixed as previously described.

Method A:

M$_n$(dRI, THF)=34 kg·mol$^{-1}$; M$_w$ (LS, THF)=284 kg·mol$^{-1}$; Ð (dRI, THF)=6.2. Semi-crystalline polymer, T$_g$=−52° C. T$_m$: −38-45° C. T$_c$: 4° C. ΔH$_c$: 5 J·g$^{-1}$.

Method B:

M$_n$(dRI, THF)=50 kg·mol$^{-1}$; M$_w$ (LS, THF)=170 kg·mol$^{-1}$; Ð (dRI, THF)=3.7. Thermal properties by DSC were identical to those by method A.

Chain Extension of Inventive Hydrogenated Pre-Polymer 3 to Produce Inventive High Molecular Weight Elastomer 3

1.5 grams of Inventive Hydrogenated Pre-Polymer 3 and 116 mg of BAz were mixed as previously described. M$_n$ (dRI, THF)=38 kg·mol$^{-1}$; M$_w$ (LS, THF)=168 kg·mol$^{-1}$; Ð (dRI, THF)=4.5. Non-crystalline polymer, T$_g$=−64° C.

Method B:

M$_n$(dRI, THF)=19 kg·mol$^{-1}$; M$_w$ (LS, THF)=34 kg·mol$^{-1}$; Ð (dRI, THF)=2.3. Thermal properties by DSC were identical to those by method A.

Crosslinking of Inventive Hydrogenated Pre-Polymer 2 to Produce Inventive Crosslinked Elastomer 2

7 grams of Inventive Hydrogenated Pre-Polymer 1 and 450 mg of tris-aziridine (PZ-28) were mixed and cured as previously described.

The sample curing time was 87 s at 180° C. Semi-crystalline polymer, Tg=−51° C. Tm: −38-40° C. T$_c$: 2 ΔH$_c$: 4 J·g$^{-1}$. Strain at break (ε)=193±12%; Tensile strength at break (σ)=1540±74 kPa. Density=0.8822±0.007 g/ml. Entanglement M$_n$(25° C.)=970 g/mol.

Crosslinking of Inventive Hydrogenated Pre-Polymer 3 to Produce Inventive Crosslinked Elastomer 3

7 grams of Inventive Hydrogenated Pre-Polymer 2 (P2H and 550 mg of tris-aziridine (PZ-28) were mixed and cured as previously described. The sample curing time was 85 s at 180° C. Non-crystalline polymer, Tg=−62° C. Strain at break (ε)=149±11%; Tensile strength at break (σ)=1052±58 kPa. Density=0.8850±0.003 g/ml. Entanglement M$_n$(25° C.)=1200 g/mol.

Table 3 provides the gel fraction, glass transition temperature, decomposition temperature elastic modulus, and specific gravity of each of Inventive Crosslinked Elastomers 2-3 and Inventive Chain Extended, Crosslinked Elastomers 2-3.

TABLE 3

| | Gel fraction | $T_g$ (° C.) | $T_d$ (° C.) | G (10$^5$ Pa) | ρ (g/ml) |
|---|---|---|---|---|---|
| Inv. Crosslinked Elastomer 2 | 0.95 | −51 | 340 | 7.6 | 0.8822 ± 0.007 |
| Inv. Crosslinked Elastomer 3 | 0.96 | −62 | 336 | 5.3 | 0.8850 ± 0.003 |
| Inv. Chain Extended, Crosslinked Elastomer 2 | 0.95 | −53 | 322 | 6.6 | 0.8825 ± 0.005 |
| Inv. Chain Extended, Crosslinked Elastomer 3 | 0.95 | −63 | 326 | 3.5 | 0.8850 ± 0.005 |

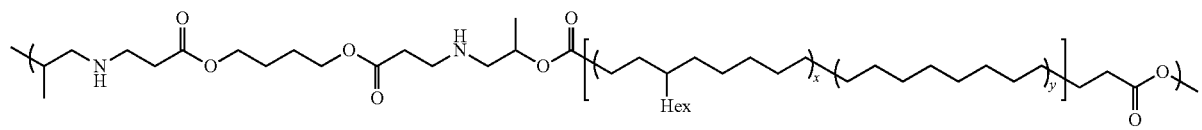

Table 4 provides the tensile properties and hysteresis of each of Inventive Crosslinked Elastomers 2-3 and Inventive Chain Extended, Crosslinked Elastomers 2-3.

TABLE 4

| | Tensile | | | Hysteresis | | Change in elastic modulus from 0° C. to 200° C. (%) |
| --- | --- | --- | --- | --- | --- | --- |
| | ε (%) | σ (Mpa) | E (Mpa) | Cycle 1 (%) | Cycle 2 (%) | |
| Inv. Crosslinked Elastomer 2 | 193 ± 12 | 1.74 ± 0.07 | 2.50 ± 0.07 | 9.7 ± 0.5 | 6.4 ± 0.4 | 7 |
| Inv. Chain Extended, Crosslinked Elastomer 2 | 174 ± 5 | 1.45 ± 0.08 | 2.47 ± 0.08 | 11.7 ± 1.5 | 8.6 ± 1.4 | 9 |
| Inv. Crosslinked Elastomer 3 | 149 ± 11 | 1.05 ± 0.06 | 1.75 ± 0.08 | 7.4 ± 0.7 | 5.0 ± 1.3 | 30 |
| Inv. Chain Extended, Crosslinked Elastomer 3 | 231 ± 32 | 1.17 ± 0.09 | 1.65 ± 0.05 | 12.2 ± 0.4 | 9.3 ± 0.8 | 20 |

Test Methods

Test methods include the following:

NMR $^1$H and $^{13}$C NMR spectra were recorded on a Bruker AV500 spectrometer at room temperature using CDCl$_3$ as solvent. Proton chemical shifts were referenced to TMS (0.00 ppm). Carbon chemical shifts were referenced to CDCl$_3$ (77.23 ppm).

Number-average molecular weight ($M_n$) was determined by $^1$H NMR end group analysis. Weight-average molecular weight ($M_w$) was determined at 25° C. using a Size Exclusion Chromatography (SEC) instrument with THF as the mobile phase at a flow of 1 mL/min. The SEC instrument used is equipped with a Wyatt Technology DAWN Heleos II multiangle laser light scattering (MALLS). Size exclusion was performed with one Waters Styragel guard column and three successive Waters Styragel columns (HR6, HR4 and HR1), packed with rigid 5 μm styrene diviylbenzene particles. Together these columns provide effective separation of samples in the molecular weight range of 100-10,000,000 g mol$^{-1}$. Dispersity (Đ) was determined with the same SEC instrument but from the RI Wyatt Optilab T-rEX detector.

DSC

Differential Scanning Calorimetry (DSC) was performed on a TA Instruments Discovery DSC calibrated with an indium standard. Samples with a minimum mass of 4 mg were prepared in hermetically sealed aluminum pans and analyzed under N2 with a heating rate of 10° C./min. Thermal transition temperatures were determined from the second heating after annealing above the glass transition or melting point for at least 1 min to erase thermal history.

Specific Gravity

Specific gravities were determined with a density gradient column (isopropanol/ethylene glycol). The column was calibrated using floats of known density and the temperature was regulated at 25° C. Reported density values are averages and standard deviations of 5 samples equilibrated for 1 hour.

Rheometry

Curing times were measured on a TA Instruments ARES rheometer with a cone-and-plate geometry (25 mm parallel, 0.1 radian), nitrogen-purged chamber, and a thermocouple located directly below the bottom plate. Curing time experiments were conducted at 180° C. and a steady shear rate of 20 s$^{-1}$. The increase in viscosity was followed as a function of time until the sample turned into a solid.

Tensile Testing

Tensile strain and tensile hysteresis tests of crosslinked and/or chain extended, crosslinked elastomers were conducted on a Rheometrics Scientific Minimat Instrument. Tensile properties of ASTM D1708 microtensile bars were tested at strain rate of 127 mm/min; all values are reported as the average and standard deviation of at least four samples. Tensile hysteresis of ASTM D1708 microtensile bars was tested at strain rate of 110 mm/min. The hysteresis value is calculated as the difference in the area under the tensile stress-strain curve for the extension and retraction of the sample.

Dynamic Mechanical Temperature Analysis

Dynamic Mechanical Temperature Analysis (DMTA) was performed by torsion test on a rectangular geometry 12.7×50 mm (thickness ~1 mm) using an ARES-G2 rheometer (TA Instruments). During the experiment temperature was increased from −90 to 200° C. at a rate of 5° C./min. The frequency and strain were constant at 6.28 rad/s and 0.05%, respectively.

The present invention may be embodied in other forms without departing from the spirit and the essential attributes thereof, and, accordingly, reference should be made to the appended claims, rather than to the foregoing specification, as indicating the scope of the invention.

We claim:

1. A process to produce a crosslinked elastomer comprising:

reacting alkyl-cis-cyclooctene and optionally cis-cyclooctene, in the presence of a difunctional chain transfer agent and/or a polyfunctional chain transfer agent under ring opening metathesis polymerization conditions to form an unsaturated polyolefin reactive telechelic pre-polymer;

hydrogenating the unsaturated polyolefin reactive telechelic pre-polymer to produce a hydrogenated polyolefin reactive telechelic pre-polymer; and thermally crosslinking the hydrogenated polyolefin reactive telechelic pre-polymer with a polyfunctional compound which is reactive with the hydrogenated polyolefin reactive telechelic pre-polymer, optionally in the absence of a catalyst, to form a crosslinked elastomer.

2. The process according to claim 1, wherein the polyfunctional compound is selected from the group of polyamines and polyepoxides.

3. The process according to claim 1, wherein the polyfunctional compound which is reactive with the hydrogenated polyolefin reactive telechelic pre-polymer is polyfunctional aziridine.

4. The process according to claim 3, wherein the polyfunctional aziridine is trimethylolpropane tri(2-methyl-1-aziridine propionate).

5. The process according to claim 1, wherein a mole ratio of the functionalities of the polyfunctional compound to the functionalities of the hydrogenated polyolefin reactive telechelic pre-polymer is from 1:0.94 to 1:1.06.

6. The crosslinked elastomer produced by the process of claim 1, wherein the crosslinked elastomer has one or more properties selected from the group consisting of: (a) gel fraction of equal to or less than 0.99 and equal to or greater than 0.3; (b) a $T_d$ of equal to or greater than 310° C.; (c) a glass transition temperature, $T_g$, less than or equal to or less than −25° C.; (d) hysteresis of 20% or less; and (e) a difference in an elastic modulus at 0° C. and the elastic modulus at a temperature 1° C. less than the decomposition temperature is less than 35%.

7. A process to produce a chain extended polyolefin reactive telechelic pre-polymer comprising:

reacting alkyl-cis-cyclooctene and optionally cis-cyclooctene, in the presence of a difunctional chain transfer agent and/or a polyfunctional chain transfer agent under ring opening metathesis polymerization conditions to form an unsaturated polyolefin reactive telechelic pre-polymer;

hydrogenating the unsaturated polyolefin reactive telechelic pre-polymer to produce a hydrogenated polyolefin reactive telechelic pre-polymer; and chain extending the hydrogenated polyolefin reactive telechelic pre-polymer with a difunctional compound which is reactive with the hydrogenated polyolefin reactive telechelic pre-polymer, optionally in the absence of a catalyst, to form a high molecular weight elastomer.

8. The process according to claim 7, wherein the difunctional compound is selected from the group of diamines and diepoxides.

9. The process according to claim 7, wherein the difunctional compound which is reactive with the hydrogenated polyolefin reactive telechelic pre-polymer is difunctional aziridine.

10. The process according to claim 9, wherein the difunctional aziridine is butane-1,4-diylbis(3-(2-methylaziridin-1-yl)propanoate).

11. A process to produce a crosslinked and chain extended elastomer comprising:

reacting alkyl-cis-cyclooctene and optionally cis-cyclooctene, in the presence of a difunctional chain transfer agent and/or a polyfunctional chain transfer agent under ring opening metathesis polymerization conditions to form an unsaturated polyolefin reactive telechelic pre-polymer;

hydrogenating the unsaturated polyolefin reactive telechelic pre-polymer to produce a hydrogenated polyolefin reactive telechelic pre-polymer; and simultaneously thermally crosslinking the hydrogenated polyolefin reactive telechelic pre-polymer with a polyfunctional compound which is reactive with the hydrogenated polyolefin reactive telechelic pre-polymer and chain extending the hydrogenated polyolefin reactive telechelic pre-polymer with a difunctional compound which is reactive with the hydrogenated polyolefin reactive telechelic pre-polymer, optionally in the absence of a catalyst, to form a crosslinked and chain extended elastomer.

12. The process according to claim 11, wherein the polyfunctional compound which is reactive with the polyolefin reactive telechelic pre-polymer is polyfunctional aziridine and the difunctional compound which is reactive with the hydrogenated polyolefin reactive telechelic pre-polymer is difunctional aziridine.

13. The process according to claim 12, wherein the polyfunctional aziridine is trimethylolpropane tri(2-methyl-1-aziridine propionate).

14. The process according to claim 12, wherein the difunctional aziridine is butane-1,4-diylbis(3-(2-methylaziridin-1-yl)propanoate).

15. The process according to claim 11, wherein the polyfunctional compound is selected from the group of polyamines and polyexpodies.

16. The process according to claim 11, wherein the difunctional compound is selected from the group of diamines and diepoxides.

17. The crosslinked and chain extended elastomer produced by the process of claim 11, wherein the crosslinked and chain extended elastomer has one or more properties selected from the group consisting of: (a) gel fraction of equal to or less than 0.99 and equal to or greater than 0.3; (b) a $T_d$ of equal to or greater than 310° C.; (c) a glass transition temperature, $T_g$, less than or equal to or less than −25° C.; (d) hysteresis of 20% or less; and (e) a difference in an elastic modulus at 0° C. and the elastic modulus at a temperature 1° C. less than the decomposition temperature is less than 35%.

\* \* \* \* \*